July 27, 1926.

E. J. MURPHY ET AL 1,594,067

SEARCHLIGHT

Filed May 17, 1920  8 Sheets-Sheet 2

Inventors:
Edwin J. Murphy,
Leonard P. Hutt,
by Albert G. Davis
Their Attorney.

July 27, 1926.

E. J. MURPHY ET AL 1,594,067

SEARCHLIGHT

Filed May 17, 1920   8 Sheets-Sheet 3

Inventors:
Edwin J. Murphy,
Leonard P. Hutt,
by Albert G. Davis
Their Attorney.

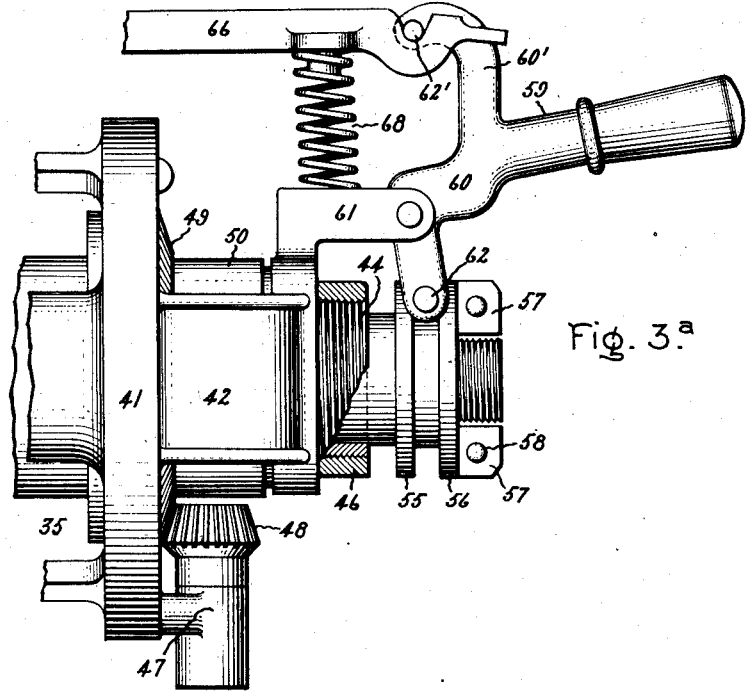
Fig. 3.ª
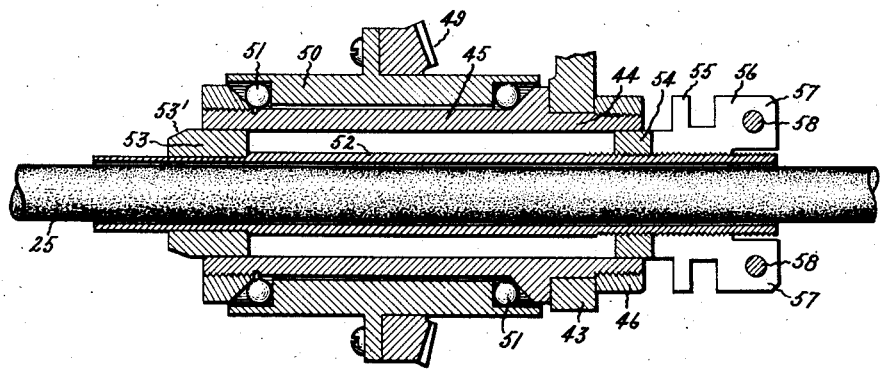
Fig. 4.

July 27, 1926.
E. J. MURPHY ET AL
SEARCHLIGHT
Filed May 17, 1920
1,594,067
8 Sheets-Sheet 5
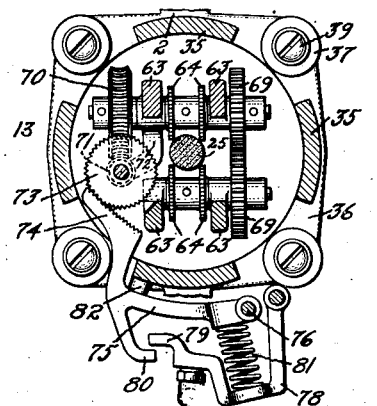
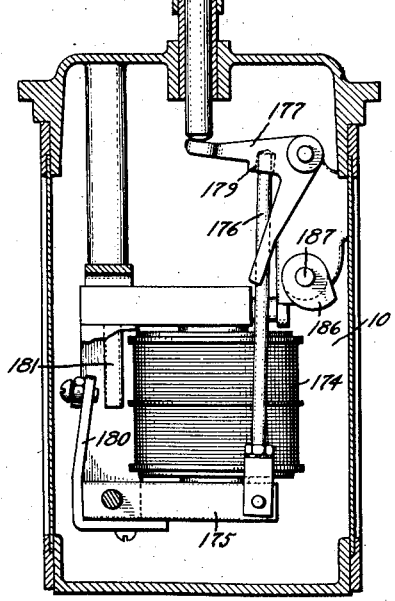
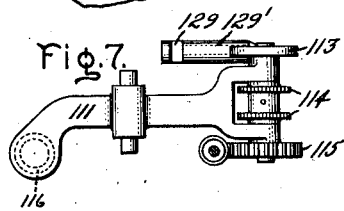
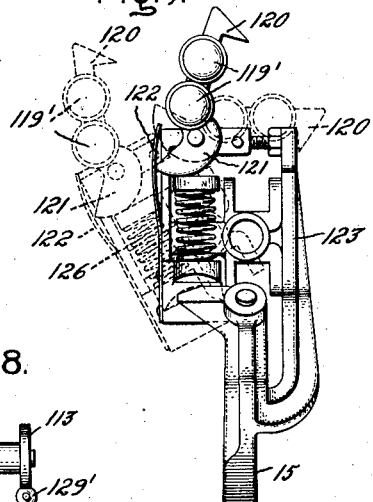
Fig.5. Fig.6. Fig.7. Fig.8. Fig.9.
Inventors:
Edwin J. Murphy,
Leonard P. Hutt,
by *Albert G. Davis*
Their Attorney.

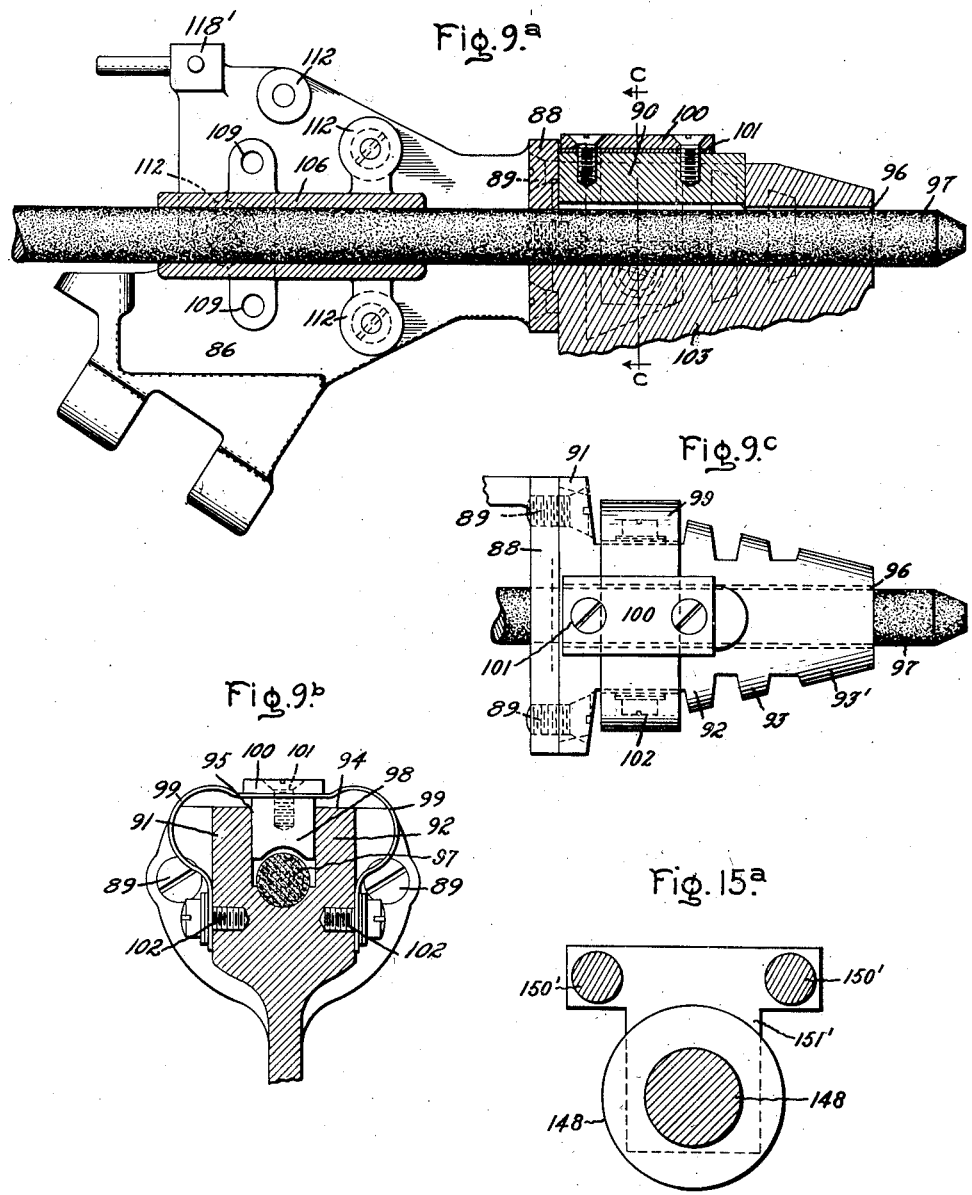

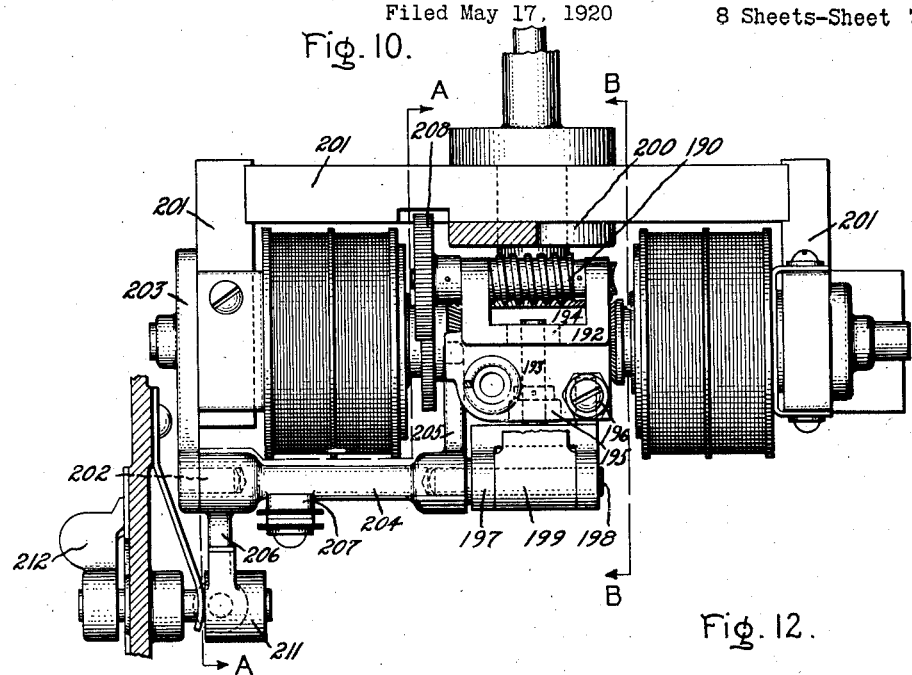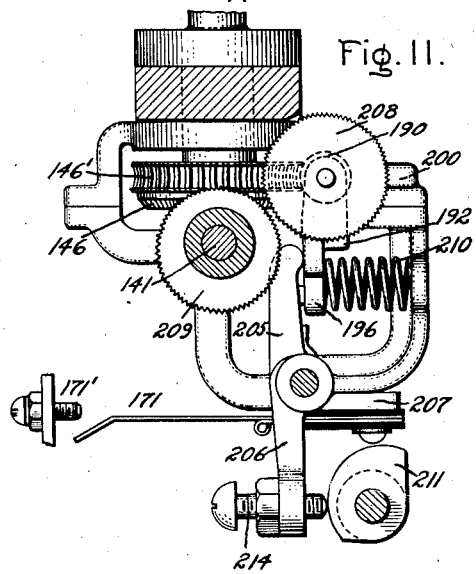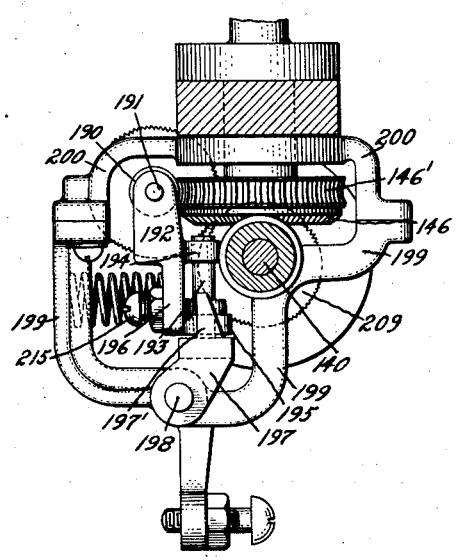

July 27, 1926.
E. J. MURPHY ET AL
1,594,067
SEARCHLIGHT
Filed May 17, 1920
8 Sheets-Sheet 8
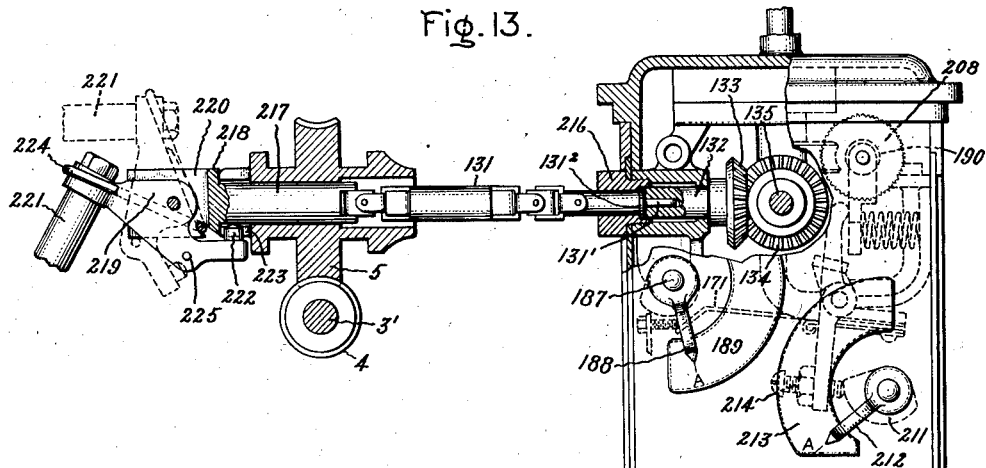
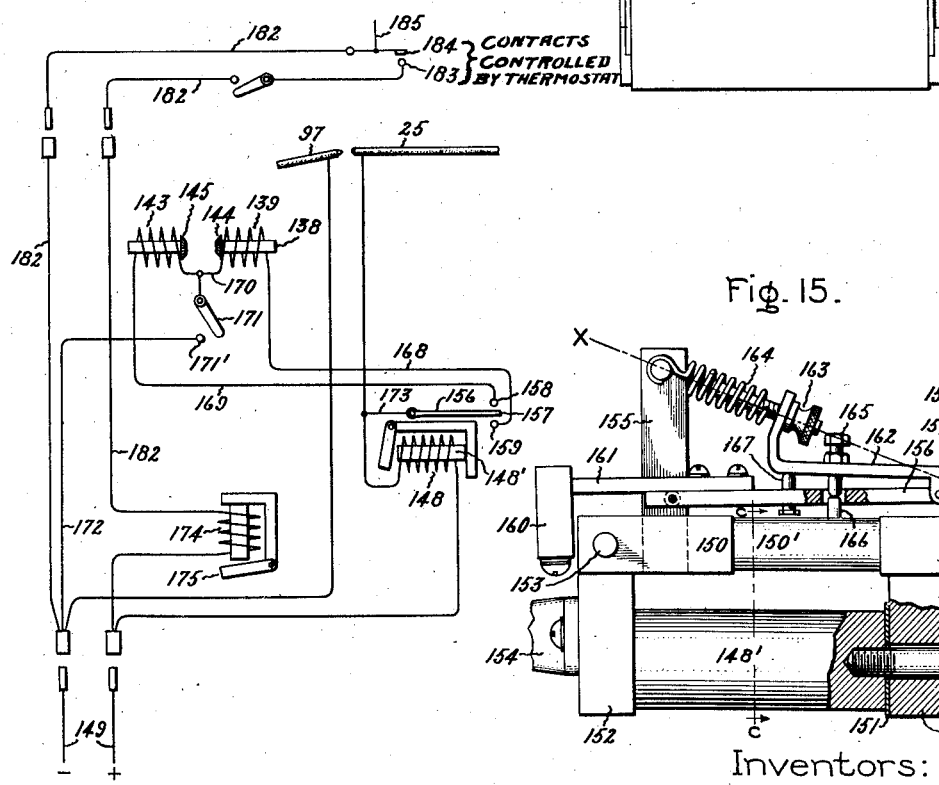
Inventors:
Edwin J. Murphy,
Leonard P. Hutt,
by
Their Attorney.

Patented July 27, 1926.

1,594,067

UNITED STATES PATENT OFFICE.

EDWIN J. MURPHY AND LEONARD P. HUTT, OF SCHENECTADY, NEW YORK, ASSIGNORS TO GENERAL ELECTRIC COMPANY, A CORPORATION OF NEW YORK.

SEARCHLIGHT.

Application filed May 17, 1920. Serial No. 381,904.

Our invention has reference to improvements in searchlights, and more specifically to arc lamps designed for use in connection therewith, although they are also adapted for use in other locations and for other purposes. When used for a searchlight the arc lamp is usually housed in a barrel equipped with a suitable reflector at one end and a window provided with a shutter at the other end. The positive electrode (anode) of the lamp is located with its crater end at the focus of the reflector and is there maintained by suitable regulating mechanism, while the negative electrode (cathode) is with its working end located and maintained at a distance to produce an arc of the desired or requisite length. In modern arc lamps of this general character the positive electrode is arranged horizontally, while the negative electrode is preferably inclined at an angle, pointing upwardly toward the crater end of the positive electrode. Provision is made for rotating the anode about its axis and for feeding both electrodes forwardly to compensate for consumption. When there is no current on the lamp the electrodes are in contact, and when current is turned on the arc is struck by withdrawing the cathode a suitable distance. Provision is also made for ventilating the searchlight barrel to remove the smoke and to cool the reflector.

Our invention is designed to secure a more reliable and efficient operation of a searchlight of this general character than has heretofore been accomplished, and we secure this result largely by automatically operating mechanisms actuated by a single motor and by novel arrangements of coordinated parts, which are particularly set forth in the following specification and defined by the claims appended thereto. The specification refers to the accompanying drawings, in which—

Figure 3:
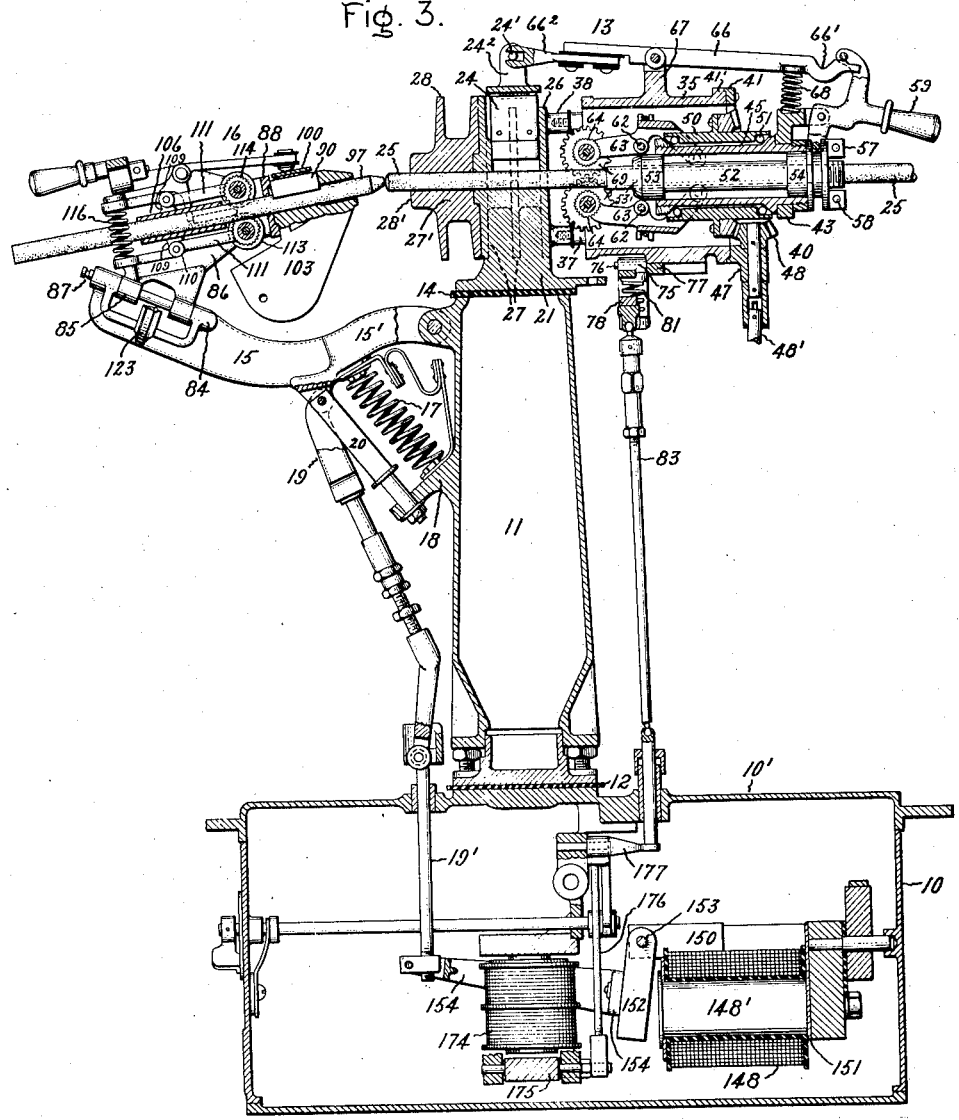
Fig. 3 is a central vertical section of the lamp mechanism, with some parts omitted for the sake of clearness.

Fig. 3ᵃ is an elevation, partly in section, upon an enlarged scale, of the rear end of the positive electrode head;

Fig. 4 is a vertical, axial section upon an enlarged scale of a portion of the rear end of the positive electrode head;

Fig. 5 is an enlarged vertical section at right angles to the plane of Fig. 3, showing the feed mechanism for the positive electrode;

Fig. 6 is a side view, partly in section, of a portion of the negative electrode head, showing the means for opening the holder and controlling the contact for the same;

Fig. 7 is a top view of a portion of the parts shown in Fig. 6;

Fig. 8 is an end view of the parts shown in Fig. 7;

Fig. 9 is an end view of the rear of the negative electrode head;

Fig. 9ᵃ is an axial section of the forward part of the negative electrode head upon an enlarged scale;

Fig. 9ᵇ is a transverse section on line c—c, of Fig. 9ᵃ, looking in the direction of the arrows indicated.

Fig. 9ᶜ is a top view of the parts shown at the right hand end of Fig. 9ᵃ.

Fig. 10 is a side elevation of the feeding and regulating control mechanism for the negative electrode;

Fig. 11 shows a section taken on the line A—A, of Fig. 10, looking in the direction of the arrows indicated.

Fig. 12 shows a section taken on the line B—B, Fig. 10, looking in the direction of the arrows indicated;

Fig. 13 is an end view of the control mechanism box, with a portion broken away to display part of its interior; also showing the drive mechanism and clutch outside the box;

Fig. 14 is a diagram of circuit connections;

Fig. 15 is an enlarged view of the relay controlling the feed of the negative electrode; and Fig. 15ᵃ is a transverse section taken on the line C—C, Fig. 15, looking in the direction of the arrows indicated.

Figure 1:
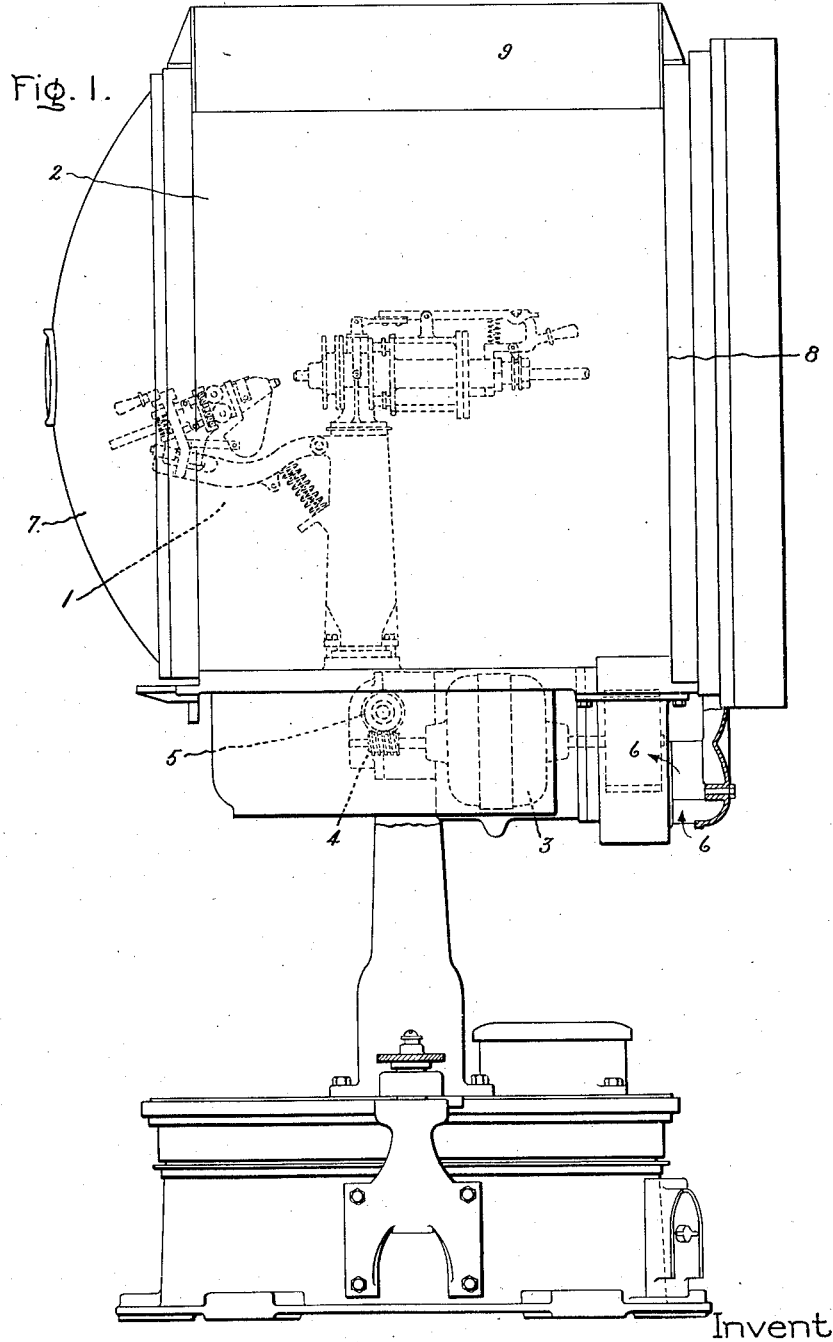
Fig. 1 is a side elevation of a searchlight with the parts of the searchlight lamp indicated in dotted lines.

The general configuration of the searchlight indicated in Fig. 1 shows in dotted lines the location of the arc-lamp 1 within the drum 2; likewise the driving electric motor 3, the worm 4 and worm gear 5 actuated thereby, and the ventilating fan, all in dotted lines. Arrows 6, 6, indicate the influx of air to the fan. The reflector, usually of the parabolic form, is mounted at the rear end 7 of the drum, and the window and shutter are mounted at the front end 8 of the drum, while the hood 9 affords an outlet for the air drawn in by the fan.

The rectangular box 10 (see Figs. 2, 3, 5, 13) contains the larger part of the lamp mechanism and the control magnets, and on the top cover 10' of the mechanism box is mounted the hollow standard 11, insulated from the cover by the insulating washer 12. The standard 11 directly supports the positive electrode head 13, insulated from the standard at 14, and an arm 15 bifurcated at one end 15' and there pivoted to a lug projecting from the standard, supports at its other end the negative electrode head 16. A helical spring 17, sufficiently strong to sustain the weight of arm 15 with its load, the negative electrode head, rests at one end upon a lug 18 projecting from standard 11, and bears with the other end upon the under side of arm 15. The swing of arm 15, and thereby of the negative holder, is caused by an adjustable pitman 19 pivoted to the arm 15. This pitman extends downwardly into the mechanism box and is actuated by an electro-magnet, as will appear further on. The movement of the arm 15 is steadied by a guide rod 20, pivoted to arm 15 and working in a guide hole in the lug 18.

The main body of the positive electrode head 13 is a framework composed of three parts, the most forward part being a casting 21, directly supported by the hollow standard 11. A slot 23 is formed in the upper wall of the casting 21, for the reception of a contact-plunger 24 which conveys the current to the positive electrode 25. The rear end of the casting 21 is closed by a plate 26, and the front part of this casting is formed with a number of heat-radiating ribs 27. To the foremost of these flanges is attached another casting 27', also provided with radiating ribs 28, and a central bore is formed through both and through which the positive electrode passes. The casting 27' terminates in front with a boss 28' which constitutes the nose of the positive electrode head. Both castings are made of good conducting non-oxidizable metal, preferably aluminum-copper bronze.

Figure 2:
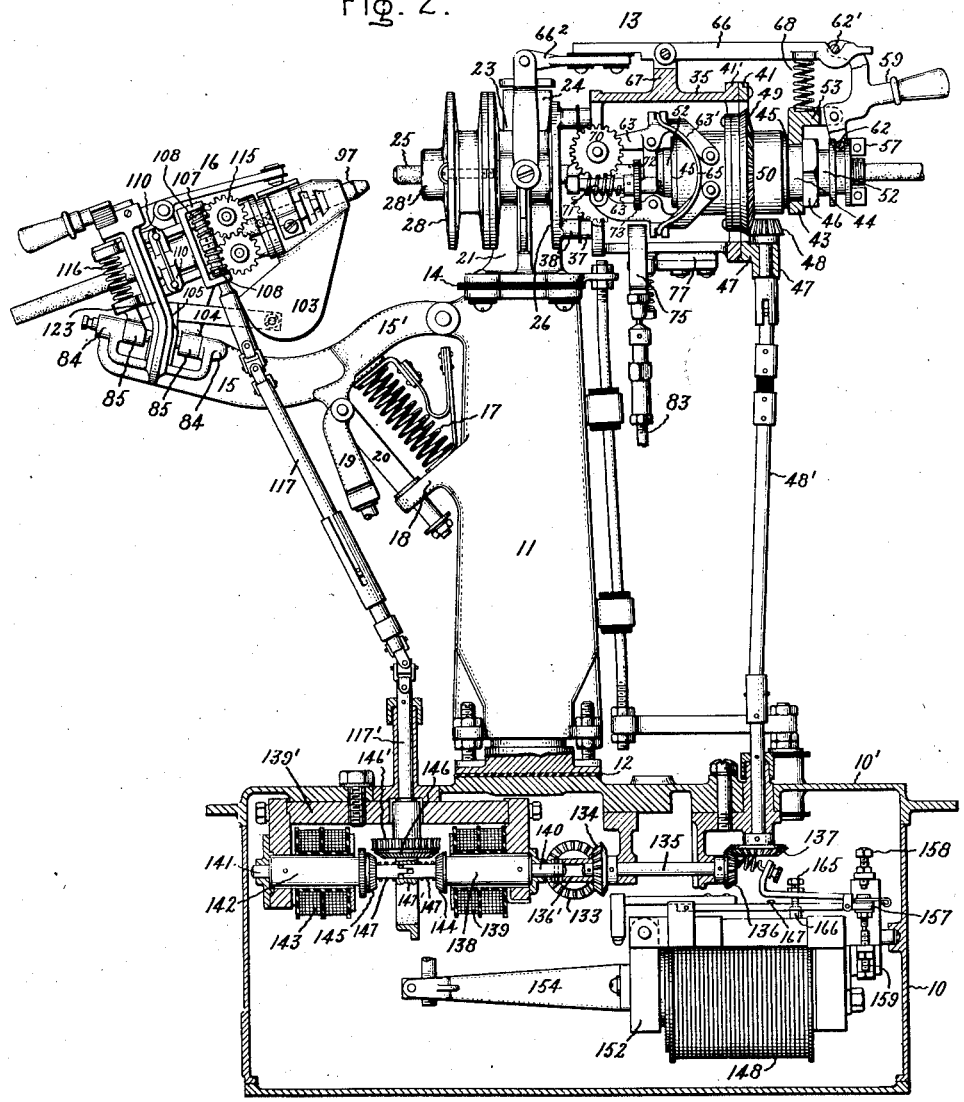
Fig. 2 is a side elevation of the lamp mechanism, partly in section.

Immediately to the rear of the casting 21, is another casting 35, cylindrical in general outline, but otherwise an open framework, recognizable as such in Fig. 2, but particularly in Fig. 5. At the end adjacent to casting 21 the casting 35 is formed with a flange 36, approximately quadratic in outline and having a slightly projecting boss 37 at each corner; these bosses match like bosses 38, formed on the plate 26, and by screws 39, passing through bosses 37 and into bosses 38, the casting 35 is secured to casting 21, but the two castings are insulated by insulating washers as indicated by black shading in Figs. 2 and 3 and by insulating sleeves in one set of bosses. The two sets of bosses 37, 38, hold the two castings apart, so as to leave an air space, between their adjacent ends.

A third casting 40, directly applied and secured to the rear end flange of casting 35, completes the framework of the positive electrode head.

The casting 40 has at its forward end a flange 41, screwed into the rear end flange 41' of casting 35, and from diametrically opposite points of flange 41 two curved elements 42 (see Fig. 3ª), extend rearwardly and then unite to form a hub 43, as a bearing or support for the neck 44, of a hollow cylinder 45 (see Fig. 4), which extends forwardly into the interior space of casting 35. The rear end of neck 44 is screw-threaded and is clamped in position against hub 43 by a nut 46; in this manner the cylinder 45 becomes, the same as casting 40, a stationary part of the positive head. From the lower part of flange 41 extends a bearing 47, in which a miter pinion 48 is journaled, which meshes with a miter gear 49, secured to a hollow cylinder 50, which surrounds the stationary cylinder 45 and is rotatable about the same on ball bearings 51.

Within the stationary cylinder 45 is a cylinder 52, which has an axial bore through which electrode 25 passes. This cylinder extends at both ends beyond the stationary cylinder and is liberally spaced from the same; it has fitted to it the bushings 53 and 54, the former at the front end of the stationary cylinder is there permanently fixed to cylinder 52, and the latter at the rear end of the stationary cylinder, is there screwed over cylinder 52, as a nut. This nut-bushing is at its rearward portion formed with two flanges 55, 56, and is there split into two parts, the flange 56 terminating in wings 57; screw bolts 58 passing through the wings serve as a means for clamping the bushing 54 at any position to which it may be adjusted on the cylinder 52. The inner wall of cylinder 45 is quite smooth and the bearing faces of bushings 53, 54 are also smooth, so that the latter may slide lengthwise with gentle friction within the cylinder 45, whereby the position of cylinder 52 with relation to the stationary cylinder 45 may be altered, for a purpose which will be presently explained. The means for moving the cylinder 52 lengthwise is a hand lever 59, pivoted with its bifurcated, downwardly extending arm 60 to a bracket 61, rising from hub 43. The prongs of this arm 60 straddle the flanges 55, 56, and a pin 62, extending between the prongs enters between the flanges, so that when the lever is rocked the cylinder 52 is moved a short distance lengthwise within the stationary cylinder 45. The front end of bushing 53 is made conical, as indicated at 53', and passes between two anti-friction rollers 62, 62, journaled on levers 63, 63 (see Figs. 2 and 3), respectively, the levers themselves being pivoted on the face of the rotatable cylinder 50, each supporting at its free end a pair of spaced knurled rollers 64, 64, between which the positive electrode passes. These levers have each a rear curved portion 63', which passes in two branches obliquely around a portion of the face of cylinder 50, and another forward portion starting from the point where the two branches 63' separate; this forward portion of each lever is also curved and is also made in two branches (see Fig. 5), but each branch extends in a plane which is parallel to the axis of cylinder 50, and the anti-friction rollers 62, 62, as well as the sets of spaced knurled rollers are mounted on these forward portions of the levers 63. The two levers are joined by two curved springs 65, 65, only one of which is visible in the drawing (see Fig. 2); the two springs tend to impel the free ends of levers 63 and with them the rollers 62, 62 and 64, 64 toward each other, so that the anti-friction rollers will bear upon the reduced part of cone 53' and the knurled rollers will bite into the positive electrode. But when cylinder 52 is pushed forwardly by the hand lever 59, the anti-friction rollers ride up the wider portion of cone 53', and the levers 63 and with them the knurled rollers separate and the positive electrode is freed, so that it can be withdrawn or a new one inserted. The lengthwise adjustment of cylinder 52 is for the purpose of establishing the proper relation between the anti-friction rollers and the conical end 53' of bushing 53.

The hand lever 59 has an upwardly extending bifurcated branch 60' between the prongs of which a pin 62' extends which bears upon the right-hand end of a lever 66, pivoted upon a standard 67, which rises from casting 35. This end of lever 66 is held up by a helical spring 68, and is formed on its upper surface with a depression 66', into which the pin 62' enters when the hand lever 59 is in its raised position, at which phase of operation the descending branch of the lever 59 has pulled the cylinder 52 rearwardly, so that the anti-friction rollers 62, 62 bear upon the reduced end 53' of bushing 53, whereby the two sets of knurled rollers 64 are made to bite into the electrode. When the hand lever is forcibly depressed against the action of spring 68, the pin 62' rides upon the elevated portion to the right hand of the depression 66', it depresses this end of the lever 66 and the pin 62 causes the cylinder 52 to move forwardly, whereby the knurled roller sets are separated and the electrode is freed, as heretofore explained.

To the left-hand end of lever 66 is joined an extension $66^2$, which is insulated from the main body of the lever, as indicated by appropriate shading. The free end of the extension is forked (see Fig. 3), and a pin 24', projecting from a lug $24^2$, of the plunger contact 24 freely enters between the prongs of the fork. These parts are so related that when the hand lever 59 is depressed, as shown in Fig. 3, the plunger contact 24 is raised, but when the hand lever 59 is raised, as shown in Figs. 2 and $3^a$, the plunger contact is depressed and bears upon the electrode, establishing the current flow. Thus, by one movement of the hand lever the electrode is freed for removal or renewal, while by another movement of the hand lever, the electrode is clamped by the sets of knurled rollers and at the same time the electrical contact between the plunger 24 and the electrode is established.

The forward parts of levers 63 support, in addition to the knurled rollers 64, the meshing gears 69, and one of the levers also carriers the worm wheel 70, which is engaged by the worm 71. This worm 71 is on a shaft that is journaled on a bracket 72, descending from one of the levers 63 and on the same shaft is also the serrated wheel 73, which operates in conjunction with a serrated segment 74, formed at the free end of a lever 75, pivoted at 76, to a support 77, which is fastened to the casting 35. Another lever 78, which is U-shaped in general outline and pivoted to the same support 77, is arranged with its free end 79, overlapping and normally making contact with a spur 80 descending from lever 75. Between the two levers (75, 78) is a helical spring 81, which raises the lever 75 in contact with a stop 82, whereby the serrated segment 74 is engaged with the serrated wheel 73. The same helical spring tends to throw lever 78 downwardly so that its free end would contact with the spur 80, but the movement of lever 78 is controlled by a sliding rod 83, ascending from the mechanism box 10, and is there actuated in a manner described further on. In the condition of the apparatus shown in Fig. 5, the rod 83 is held in its upper position, against the tension of spring 81, so that the elements 79 and 80 are not in contact.

The operation of the apparatus so far described is as follows: The miter pinion 48 is continuously rotated by a shaft 48', rising from the mechanism box; the pinion drives the miter gear 49, and thereby the rotary cylinder 50 and all the parts connected therewith, namely the levers 63—63', the bow springs 65, the knurled rollers 64, the gears 69, the worm-wheel 70, the worm 71 and the serrated wheel 73. Under the supposition that the hand lever 59 has been turned to its elevated position, as shown in Figs. 2 and 3ª, the plunger contact bears upon the electrode, the sets of knurled rollers 64 bite into and carry the electrode with them, the latter being thus rotated about its own axis, and all the parts connected with the cylinder 50 rotate about the same axis; but neither the knurled rollers nor the serrated wheel rotate about their own axes, except for one short period, namely when the serrated wheel 73 in the course of its orbit comes and remains in contact with the serrated segment 74. When this contact occurs and while it endures, the serrated wheel is given a partial rotation about its own axis, and each member of the connected gearing is rotated about its own axis, and notably the two sets of knurled wheels, whereby the electrode is propelled axially a short distance, the distance depending upon the duration of the contact between the elements 73 and 74. This duration is at its maximum in the condition of the apparatus shown in Fig. 5; but when the sliding rod 83 descends until the free end 79 of lever 78 bears upon and depresses the spur 80 of lever 75, the serrated segment 74 is drawn more or less downwardly and the duration of its contact with serrated wheel 73 is correspondingly lessened and the periodical axial forward movement of the electrode is correspondingly shortened and may be altogether stopped if the serrated segment is entirely withdrawn from the orbit of the wheel 73.

The adjustment of the position of the serrated segment is thus controlled by the position of the sliding rod 83, and the latter is, in turn, controlled by certain mechanism in the box 10, so as to advance the electrode (feeding the electrode) to compensate for its consumption, as will be explained further on.

If now the hand lever 59 is turned down, as shown in Fig. 3, the plunger contact is raised from the electrode and the knurled roller sets are separated so that the rotation of the electrode is stopped.

The negative electrode holder 16 is hinged to the arm 15, which at its free end is for this purpose provided with the bearings 84, 84, between which the hinge leaves 85, 85, extend from a casting 86; a pintle 87, passes between the bearings and leaves. The casting 86 supports all parts of the negative head; it is a flat plate the rearmost portion of which is approximately rectangular, its middle portion is approximately trapezoidal and from its narrow forward part extends another rectangular portion which terminates in a rather heavy ledge 88 Figs. 9ª and 9ᶜ, which projects at right angles to the plane of the plate. To the front face of ledge 88 is secured, by screws 89, a casting 90, which in its main outlines is conical, tapering toward the front and formed on its sides with radiating flanges 91, 92, 93; the screws 89 pass into ledge 88 through flange 91. There may be more flanges than those here shown and the most forward part of the casting is formed as a nose 93′, which may also may looked upon as a radiating flange. The radiating flanges 91 and 92 are spaced apart rather wider than the others and the casting is flattened on the sides between these flanges as indicated in Fig. 9ᶜ. Also, between these two flanges and beyond the same the casting is flattened on top as indicated at 94, Fig. 9ᵇ, and through this flat top a slot 95 is sunk down to the central bore 96 through which the negative electrode 97 passes. Into slot 95 extends a silver or silver-tipped contact plug or brush 98, which in one of its positions bears upon the electrode, to make electrical contact with the same, and in another of its positions is lifted from the electrode, as will more fully appear farther on. On the upper face of the contact plug 98 is secured a flexible connection 99 of silver or other good conducting material by a plate 100 screwed onto the plug by screws 101. This flexible connection 99 is curved away from the casting on either side of the same, as indicated in Fig. 9ᵇ, and its other ends are secured to the flattened sides of the casting between ribs 91 and 92, by screws 102. From the underside of casting 90, and integral with the latter, extends a heat radiating wing 103, both downwardly and rearwardly, and this wing, in conjunction with the radiating ribs, dissipates the heat from the negative head effectively so that none of the parts of the head attain a dangerously high temperature that would work injury to its parts. A flexible conducting strip 104, preferably made of silver, secured to wing 103, extends rearwardly toward the hinge structure 84, 85, is then bent at right angles downwardly, as indicated at 105, and is connected to that structure or to the arm 15.

On the inner face of casting 86 is mounted a structure composed of a bored cylinder 106, which at its forward end is formed with a pair of bearings 107, for a set of twin worms 108 (see Fig. 2), and in the rear thereof with double pivot bearings 109, 109 and 110, 110, for a pair of levers 111, 111. This structure is secured to casting 86 by screws through three lugs 112, 112, 112, projecting from the cylinder 106 toward the inner face of the casting. Each of the levers 111 has journaled at its front end a smooth roller 113, two spaced knurled or serrated rollers 114, 114, and a gear wheel 115, Fig. 8. The two levers are at their rear ends urged apart by a helical spring 116, whereby the two sets of serrated rollers are urged toward and bite into the negative electrode, which, guided by the nose 93′ and cylinder 106, passes between the serrated rollers. One section of the twin worm engages one of the gears 115, and the other section the companion gear 115, and since the twists of the two sections are opposed, the gears and serrated rollers are turned in opposite directions when the twin worms are actuated; they are actuated by the universally jointed and extensible shaft 117, which receives movement by mechanism in the mechanism box 10, as will appear further on. By the action of the twin worms and the two sets of serrated rollers the negative electrode is fed to compensate for consumption or to regulate the length of the arc so long as the two levers 111 are allowed to be governed by the helical spring 116; but the effective action of this spring can be suspended at the will of the attendant, as will presently appear.

To a lug 118, projecting inwardly from the casting 86 is pivoted a lever 119, one end of which is formed with a hook 120, and the other end with a cam 121; a leaf spring 122, bears upon the cam, whereby the lever 119 is steadied in its extreme upper position. The extreme lower position is indicated in dotted lines in Fig. 9; the other extreme position is shown in solid lines and also on the left hand side of the same figure of drawing in dotted lines. In the extreme, low position, the hook 120 takes over the edge of an upright 123, rising from the arm 15, and thereby locks the lever 119 to the arm 15. There is, moreover, a pin 124, projecting from the square upper end 118' of lug 118, transversely across the swing of lever 119, whereby the downward movement of the lever is limited, for a purpose which will presently be explained. The cam 121 bears upon the rear end of a lever 125, pivoted to casting 86, and it depresses the end of that lever against the tension of a helical spring 116, when the lever 119 is thrown to the upper position shown in solid lines in Fig. 9; in that case the forward arm of lever 125 is lifted from the plate 100 thereby relieving the pressure on contact block 98. When the lever 119 is in its down position the cam 121 ceases to press upon the rear end of lever 125, and the spring 116 raises that end and brings the forward end of the same in forcible contact with plate 100 and forces the sliding contact block 98 into contact with the electrode. The forward end of lever 125 is provided with an insulated knob 127 to prevent electrical contact with plate 100. A tail-piece 128 projecting downwardly from lever 125 engages a groove 129 in a pin 129', slidable in a block 130, and with its conical end pointing to the space between the two smooth rollers 113. When the cam 121 depresses the rear end of lever 125 and thereby lifts the button 127, thus relieving the pressure of the sliding contact 98 on the electrode, the tail-piece 128 causes the pin 129' to enter between the smooth rollers 113 and pry the levers 111 apart against the action of helical spring 116. The two sets of knurled rollers thereby release the negative electrode. The lever 119 is provided preferably with two handles 119' which are sufficiently close together to be grasped by one hand of the operator or attendant for turning the lever 119 to raise the hook 120 and thereby unlock the negative head, and then to turn the whole head sidewise about the hinge structure 84, 85, whereby the whole mechanism of the head becomes accessible and any remnant of electrode may be removed and a new electrode inserted. On the left hand side of Fig. 9, the position of the head, when turned back laterally, is indicated in dotted lines. When the head is in this position, the lever 119 may be turned until it is stopped by the pin 124. If now the head is forcibly jerked back toward its normal position (about hinge 84, 85), that is to say, toward the position shown in dotted lines on the right hand side of Fig. 9, the inclined end face of hook 120 engages the upper edge of the upright 123 and rides over the latter and snaps back behind it and thus again locks the head. The presence of the pin 124 renders this mode of operation possible; in the absence of this pin the hook-end of lever 119 might be depressed by the leaf spring to such extent that the attendant would be obliged to watch and control the down position of lever 119, in order to safely bring the hook over the edge of upright 123.

It has already been pointed out that the elements of construction upon which the operation of the electrode heads depend receive their impetus from mechanism in or directly connected with the box 10 through the shafts 48', 117, sliding rod 83 and pitman 19. The source of mechanical energy for this purpose is the electric motor 3, which may be located in the box 10, as indicated in dotted lines in Fig. 1, but which for greater convenience is located outside the box. The motor shaft 3' drives the worm 4 which meshes with worm gear 5, and which by a system of universally jointed shafting 131 (see Fig. 13), is connected with shaft 132, of miter gear 133, within the box 10, by a tongue 131'. This miter gear 133 transmits motion to miter gear 134, to shaft 135, to miter gears 136, 137, and by the universally jointed shaft 48' to miter pinion 48 and miter gear 49, which drives the rotatable cylinder 50. The functions of cylinder 50 and the parts connected therewith have already been described.

With the shaft 135 is connected a mechanism for feeding the negative electrode forwards and backwards to compensate for its consumption and for regulating the length of the arc. The mechanism here shown is an electromagnetic gear reverser invented by one of us (Edwin J. Murphy)

for which application, Serial No. 351,567, was filed on January 15, 1919. We are using this particular mechanism by preference, but other suitable gear reversing mechanism might be used in its place, without departing from our invention. This being the case, the gear reverser here shown will be described as briefly as possible.

The shaft 135 carries the miter gear 134 and extends a short distance to the left hand side thereof. This extension is provided with a pin which engages slots in a loose sleeve coupling 136'. This sleeve coupling is provided at the other end with similar slots which engage a short pin on shaft 140. Shaft 140 is secured into and drives core 138. The left hand extension of shaft 140 is provided with a slotted end which turns in bearing 147'. A similar shaft 141 is provided with a tongue which engages in slotted end of 140, and 141 likewise carries and drives core 142. Two small springs 147 are provided between bearing 147' and cores 138 and 142, respectively, and it will be noted that while these cores are positively driven from shaft 135 they are free to move a small axial distance. Two knurled cones 144 and 145 are secured to the cores 138 and 142 near the bearing 147', respectively, which cones are adapted to make positive contact with a knurled cone 146 whenever the exciter coils 139 or 143 are excited.

The knurled cone 146 is on the shaft 117' which is connected by a universal joint to shaft 117. Immediately above this cone 146 the shaft 117' also carries a worm wheel 146', the function of which will appear further on. The two electro-magnets 139 and 143 have a common U-shaped yoke 139', secured to the cover of box 10, and this yoke has a bearing for the enlarged lower end of shaft 117'. The cores 138 and 142 have bearings each in one of the forks of the yoke. The cones 144, 145, and 146, as well as the enlarged portion of shaft 117' are of iron or mild steel, while the shafting 140, 141, are made of non-magnetic material. The magnetic reluctance between the cores and their bearings, as also between the shaft 17' and its bearing in the yoke is negligibly small, so that there are only two gaps in the two magnetic circuits of the electro-magnets 139, 143, namely between the cones 144 and 146 on the one hand and between the cones 145 and 146 on the other hand. When either of the electro-magnets is energized its respective magnetic gap will tend to close, and since the cores 138 and 142 are movable one or the other of these gaps will actually close. When the electro-magnet 139 is energized the core 138 with its coned end 144 moves toward the left until the latter engages the iron cone 146 and is there held by magnetic attraction; the shafts 117' and 117 are thereby rotated in a certain direction, whereby the feeding gearing of the negative head propels the negative electrode in a certain direction (forward or backward), and when the electro-magnet 143 is energized the pinion 145 comes into action and the negative electrode is propelled in the opposite direction (backward or forward). The means for automatically and selectively energizing the electro-magnets are intimately connected with the means for starting the arc. It is, of course, understood that the cones 144 and 145, as well as cone 146, might be operated by friction only.

The arc is started by the striking electro-magnet 148 (Figs. 2, 3, 14 and 15) which is in series with the electrodes and receives current from the main line. A swinging armature 152 carries the arm 154 which at its free end has pivotally joined to it continuation 19' of pitman 19. When the electromagnet 148 is energized, the pitman actuates the arm 15 and thus the negative electrode is withdrawn from the positive electrode thereby striking the arc.

The above mentioned striking magnet is modified in structure so as to control another armature 156 which acts practically as a contact making ammeter for controlling the current in the lamp, as hereinafter described. The magnetic circuit of this electromagnet consists of a cylindrical core 148' attached to an L-shaped yoke 150. The magnetic circuit is further completed by the armature 152 pivoted to the yoke at 153. The upper portion of the magnetic circuit consists of two rectangular rods 150 riveted into stationary base 151'. A portion of rods 150 is turned down to cylindrical shape in order to reduce the cross-section thereof. This reduced section becomes highly saturated and produces a strong leakage flux between the ends of 150 and this leakage flux attracts the swinging armature 156. This armature being pivotally supported to the fixed standards 155 which are of non-magnetic material. The free end of armature 156 carries a contact 157 arranged to play between the two fixed but adjustable contacts 158, 159. This armature is counter-balanced by a weight 160 secured at the opposite end of 156 by means of a brass strip 161.

Near the contact end of armature 156 is pivoted an arm 162, of non-magnetic material, the arm extending backward toward the pivot of the armature 156, and is at its rear end turned upward and there carries a screw 163, which holds one end of a helical spring 164, the other end of which is secured to standard 155; the tension of the spring can be adjusted by the screw. About midway between the ends of armature 156, the latter is perforated and in line with this perforation the arm 162 carries an adjustable stop 165, which is in line with a fixed stop 166, secured to the cylindrical part of yoke 150; another adjustable stop 167, is on the armature 156 in the path of the arm 162.

The fixed contacts 158, 159 are connected with the solenoids 139, 143 (see Fig. 14) by conductors 168, 169, and the series connection 170, of the solenoids is connected by a switch 171, with the negative main by conductor 172, the armature 156 being connected by conductor 173 with the positive main.

The operation of the described relay system for the automatic control of the negative electrode depends upon the relative pull upon the armature 156 due to the leakage flux and that due to the spring 164. The magnetic pull (with any degree of saturation of the core 148') depends upon the air gap between the armature 156 and the yoke; it varies inversely with a power of the air gap, but the power itself depends upon the masses and shapes of the armature and core. The simple statement that the pull varies inversely with the square of air gap is strictly true only with reference to magnetic points; in actual practice where the masses are considerable and have various shapes it can only be said that the pull varies inversely with the n-th power of the gap, with the understanding that n is greater than unity. On the other hand, the pull upon the armature 156 by and in the direction of the axis of spring 164 is a linear function, so that the resultant pull is a rather complex function. From the foregoing it is clear that the numerical values of the two counteracting forces vary with the masses of the armature and core, on the one hand, and with the size and the nature of the material of the spring, and also with the leverages upon which it acts from moment to moment, on the other hand; but in any such structure the rate of variation of the magnetic pull, with reference to the air gap, is considerably greater than the rate of variation of the pull of the spring, and it is upon this fact that the utility of our relay system depends.

In working out this relay it was found advisable to provide a small non-magnetic gap 151 between the core 148' and the stationary plate 151'. This prevented too high a saturation of the whole magnetic circuit and improved the sensitiveness of the relay current changes in the exciting coil.

When the normal current passes through the lamp and armature 152 is attracted, the state of equilibrium of leakage flux armature 156, shown in Fig. 15, exists; the contact 157 touches neither of the contacts 158, 159, the stops 165, 166 are in contact and arm 162 bears upon stop 167. The adjustable elements 157, 158, 159, 163, 165, 167, are suitably manipulated to establish this condition. Slight imperceptible variations of current and consequent variations of saturation of the magnet core 148' and of the leakage flux do not perceptibly affect this condition of equilibrium; in fact, the ordinary tremblings of the apparatus due to external causes, such as the vibration of a war vessel upon which the searchlight may be mounted, do not sensibly affect this condition. But if the current strength is reduced to a degree that weakens the saturation of the core to an amount to perceptibly reduce the leakage flux, the armature 156 promptly responds, because the magnetic pull is weakened at a rapid rate while the pull of the spring 164 is not affected, so that it overbalances the magnetic pull; armature 156 rises and contact 157 strikes the fixed contact 158. By this action the stop 165 rises above stop 166, but the arm 162 continues in contact with stop 167. In this condition of the apparatus the lever 156 is again in a quasi stable equilibrium, and contact 157 is only returned to its middle position when the current again rises to its normal strength.

When the current, for any reason whatever, rises perceptibly above normal strength, the magnetic pull waxes at a rapid rate, it overpowers the slower growing pull of the spring 164 and the armature 162 descends until contact 157 strikes contact 159, and is there again in quasi stable equilibrium. By this downward movement of lever 156, the stops 165 and 166 are maintained in contact, the latter now acting as a secondary pivot, but the arm 162, pulled by spring 164 and turning about its pivot near the free end of armature 156 is raised from stop 167, as shown in Fig. 2.

In the operations and for the preservation of the quasi stable equilibrium of contact 157 in its three positions, the direction of the axis of spring 164 is of importance. This axis (in the line of which the spring primarily acts) is indicated by the dotted line X, and it will be noticed that it passes above the pivot of arm 162; moreover the direction of this axis can be slightly adjusted by the stop 167. While the resultant force of spring 164 is in the line of its axis, only a component of this force, at right angles to the axis, acts upon the arm 162 to turn it about its principal and secondary pivots and maintaining its contact with stop 167. This component increases with the angle which the axis of the spring forms with a line connecting the point of central attachment of the spring on standard 155 with the pivot of arm 162, and the greater this component, the greater must be the magnetic pull on armature 156 to balance or to overpower the same. For this reason the contact 157 can only be moved from any of its three positions by a considerable variation of the main current which energizes the core 148'.

It has hereinbefore been pointed out that the rate of feed of the positive electrode is controlled by the position of the sliding rod 83 (see Fig. 5), and that the latter is controlled by mechanism in box 10. This mechanism comprises an electro-magnet 174, its armature 175, a pitman 176, and a bell crank lever 177. The pitman 176 is pivoted at one end to the free end of the armature and its other end enters a recess 179, in the lower face of one arm of the lever 177, and on the upper face of this arm rests the sliding rod 83 by gravity assisted by spring 81. When the magnet is energized the pitman raises the horizontal arm of the bell crank lever, and this in turn, raises the sliding rod, whereby the serrated segment 74 is placed in the orbit of the serrated wheel 73. This is the condition shown in Fig. 5. When the electromagnet is de-energized, the armature, the pitman, the horizontal arm of the bell crank lever and the sliding rod descend until the elements 79, 80 come in contact, whereby the serrated segment is removed from the orbit of the serrated wheel and the feed of the positive electrode is stopped. The descent of the armature is limited by a strap 180, carried thereby, coming in contact with a stop rod 181. The magnet 174 is in a circuit 182 (see Fig. 14) derived from the mains 149. This circuit is normally open at the contacts 183, 184, one of which, 184, is movable by a mechanical connection 185 with a thermostat. The thermostat is not shown in the drawing, nor is the manner of affecting it indicated, since this is well understood by those skilled in the art. It is understood that rays from the crater of the positive electrode are directed upon the thermostat when the crater plane recedes from the focus of the reflector a certain distance by reason of the consumption of the electrode. The thermostat then closes the circuit of the magnet 174 at the contacts and forward feed of the electrode takes place. By the forward feed the crater plane is restored to its position at the focus of the reflector and the rays from the crater are now diverted from the thermostat, whereby the feed is stopped.

In addition to the automatic controls of the electrodes, hereinbefore described, provision is made to actuate the electrodes manually in the event that any part of the automatic mechanism should break down.

The manual control of the positive electrode is provided by a cam 186 (see Fig. 5), on a shaft 187, in such relation to the descending arm of bell crank lever 177 that when rotated in the proper direction it will actuate the lever to raise the sliding rod 83 and thereby place the serrated segment into the orbit of wheel 73. This means is resorted to if the magnet 174 should fail to operate, its armature dropping and consequently sliding rod 83, by its weight, assisted by spring 81, turning the bell crank lever until the descending arm of the same bears upon the cam 186 at its shortest radius of curvature. If now the cam is turned to bring its eccentric face against the lower arm of lever 177, and to the extent this is done, the sliding rod 83 is raised in proportion and the rate of feed of the electrode follows a like proportion. The shaft 187 is extended through box 10 and its outer end is provided with a combined thumb piece and index 188 by which it can be turned over a graduated scale 189, showing the adjustment of the cam and corresponding rate of electrode feed attained thereby.

The automatic control of the negative electrode is primarily dependent upon the closure of the switch 171 as has been explained with reference to Fig. 14; when that switch is opened the manual control may be resorted to. While the automatic control is effective the worm wheel 146 (see Fig. 2) runs idly, but when the manual control is started the worm 190 (see Figs. 10, 11, 12, 13) is put in engagement with the worm wheel.

The worm 190, is on a shaft 191, journaled on a U-shaped bracket 192, which in turn is pivoted on a pin 193, passing through two lugs 194, 195, projecting from the bracket. The lug 194 projects from the bracket proper while lug 195 projects from a tail piece 196, extending downwardly from the bracket. The pin 193 is secured to a second U-shaped bracket 197, which can turn about the pin 198, fast on a triple curved bracket 199, which is itself secured to bracket 200, descending from the frame 201, secured to the top cover of box 10.

In line with pin 198 is a pin 202, projecting from an arm 203, fast on frame 201. On the pins 198 and 202 is pivoted a lever 204, which has an extended pivot bearing as shown (Fig. 10), and one upwardly extending arm 205, and one downwardly extending arm 206. From the pivot bearing of lever 204 projects an arm 207, at right angles to arms 205 and 206, and to this arm 207 is secured, but insulated from it, the switch blade 171 in position to make or break contact with the adjustable contact 171' when the lever 204 is rocked. One end of shaft 191 carries a serrated wheel 208, designed to engage the serrated wheel 209, when the U-shaped bracket 192 is suitably swung about pivot pin 193 and also, through the intermediary of the U-shaped bracket 197, about pin 198. By such combined movement not only does serrated wheel 208 engage the serrated wheel 209, but the worm 190 also engages the worm wheel 146', and since serrated wheel 209 is on the continuously rotating shaft 141, wheel 209 transmits motion to the wheel 208 and by worm 190 to worm wheel 146', whereby the negative electrode feeding gearing is actuated. The serrated wheel 209 is however eccentrically mounted on its shaft 141, so that during each rotation of wheel 209 it is only part of the time in engagement with wheel 208, and the duration of this period of engagement depends upon the amount of movement given to the two U-shaped brackets 192, 197.

A helical spring 210, interposed between bracket 199 and the tail piece 196 tends to swing bracket 192 about pin 193 (and also about pin 198) in such direction as to keep serrated wheel 208 in periodic engagement with eccentric wheel 209. The extent of this swing and therefore the length of the periodic engagement is controlled by the position of a cam 211, which is manipulated by the attendant through the combined thumb piece and pointer 212, the pointer playing over the face of a graduated scale 213 (see Fig. 13). This cam receives the thrust of spring 210 through the lower arm 206 of lever 204, by an adjustable screw pin 214. When the cam 211 presents its shortest radius of curvature to screw pin 214, as shown in Fig. 11, the serrated wheel 208 is in the closest proximity to wheel 209, so that under this adjustment the periodic forward feed of the electrode is at its maximum. When the cam 211 is turned to present a longer radius of curvature to pin 214, the upper arm 205 of lever 204, acting upon tail piece 196, turns U-shaped bracket 192 against the tension of spring 210 so as to move serrated wheel 208 about pin 193, and through the intermediary of an adjustable pin 215 (which passes through the tail piece 196) bearing upon a projection 197' from bracket 197, this bracket is swung about pin 198. The effect of this is that wheel 208 recedes from wheel 209 and the periodic forward feed of the electrode is reduced; and if the longest radius of curvature of cam 211 is presented to pin 214, the serrated wheel 208 is so far removed from the eccentric serrated wheel 209, that the latter does not any more engage the former to any extent and the worm 190 is entirely disengaged from worm wheel 146', so that the manual electrode feed is suspended. This condition is shown in dotted lines in Fig. 13; it is the condition in which the negative electrode feed is automatically controlled, since now the worm wheel is again running idly and the circuit of the solenoids 139, 143, is connected to the mains by the switch arm 171 bearing on contact 171'.

From the foregoing description it is clear that when the lamp is about to be started when all its parts are in good condition, the attendant turns the pointers 188 and 212, so as to bring the lowest point of cam 186 to face the lower arm of bell crank lever 177, as shown in Fig. 5, and the highest point of cam 211 to bear upon the screw pin 214, as shown in Figs. 11 and 13. These positions are indicated on the graduated scales 189 and 213, respectively, by a special mark, by the letter A. The attendant closely observes the condition of the arc and also the position of the crater with reference to the focus of the reflector, well known appliances being provided to aid him in this observation. If the attendant observes that the crater has unduly receded from the focus, he understands that the automatic feed of the positive electrode has failed, either partly or entirely, and he immediately puts the manual control of this electrode in operation by gradually turning the pointer 188 counter-clockwise until the crater has advanced to the focus; the rate of feed can, of course, be varied from moment to moment as required.

Similarly, if the attendant should observe that the arc has attained a greater length than desired, he understands that the automatic feed of the negative electrode has failed, partly or entirely, and he immediately makes the manual control of the negative electrode active by turning the pointer 212 gradually clockwise until the normal length of arc is restored and maintained.

The manual control of the negative electrode does not directly provide a correction for the condition when the arc becomes shorter than required, but it indirectly provides for such condition, for the attendant may, if this should happen, reduce the rate of feed to a sufficient extent to lengthen the arc.

It may of course happen that by some accident the motor 3 fails to transmit its motion to worm wheel 5; this would be a rare case of failure, but it is desirable that hand operation be provided for such case, and in Fig. 13 the requisite means for such operation are indicated.

The element of shafting 131 which enters into box 10 and is keyed to shaft 132 by tongue 131' is formed with a collar or flange 131², and a screw plug 216 prevents the accidental withdrawal of shafting 131 from the box, unless this screw plug itself is withdrawn whenever it becomes necessary to withdraw the box from the searchlight drum. The outer section 217 of shafting 131 passes loosely through worm gear 5, and its end 218 is enlarged and has a short but massive lever 119, pivoted to it in a central slot 220. This lever carries at one end a crank handle 221, and at the other end a pin 222, for normal engagement with a slot 223 in the end of the hub of worm gear 5. As shown in solid lines the lever 219 is held in its downwardly tilted position by a spring bail 224. In this position of lever 219 the outer section of shafting 131 is clutched to the worm gear 5 and rotates with the latter, whereby the gearing within box 10 is normally actuated by the motor; the lever 219 and crank handle 221 participating in this rotation.

When the motor fails to work, the attendant throws the lever 219 upward to the position indicated in dotted lines, disengaging thereby the pin 222 from slot 223 and releasing the shaft section 217 from the worm gear 5. The upward throw of lever 219 is limited by a pin 225 coming in contact with the under side of the enlarged end 218 of shaft 217, and it is there held by the same spring bail 224 which during the preceding phase of operation held the lever in its clutching position. The attendant can now freely rotate the shafting 131 until the motor drive has been restored.

What we claim as new and desire to secure by Letters Patent of the United States, is:—

1. In a searchlight, an arc lamp having a negative electrode and a holder therefor, means for driving the electrode through the holder forward or backward during the operation of the arc, reversing gears for actuating said driving means, said gears adapted to be maintained in motion always in the same direction while the arc is in operation, means for maintaining said gears in position out of engagement with said electrode driving means while the arc remains of a given length, and electromagnetic means responsive to the arc current for moving one of said gears into engagement with said driving means when the arc increases above a given length, whereby the electrode is driven in one direction, said electromagnetic means responsive to the arc current for also moving the other of said gears into engagement with said driving means when the arc decreases below a given length to drive the electrode in the opposite direction.

2. In a searchlight arc-lamp, the combination of a negative electrode, a holder therefor, means for moving the electrode through the holder in one direction to compensate for consumption and in the opposite direction for regulating the length of the arc, electromagnetically operated reversing gears for actuating said means adapted to be maintained in motion during the operation of the lamp, an electromagnet adapted to be excited by the arc current, and a switch controlled by leakage flux from the magnet for controlling the magnetic element of the reversing gears for shifting the gears when the current varies, said switch having two closed and one opened position whereby the electrode may be fed forward or back when the current varies or retained stationary during the constant operation of the lamp.

3. In a searchlight arc-lamp, the combination of a movable, positive electrode, a negative electrode and a holder therefor, said negative holder provided with gearing for axially moving the electrode through the holder independently of the movement of the positive electrode, and an electromagnetic reversible gear clutch composed of two constantly rotated spaced elements and an intermediate rotatable element, means for maintaining said gears in position out of engagement with said intermediate gear, while the arc length remains between given limits, said intermediate gear being connected with the electrode gearing, an electromagnet controlled by the current of the arc, and a switch controlled by the magnet for controlling the magnetic element of the reversible gear clutch for shifting one or the other of the spaced elements into driving contact with the intermediate element when the arc varies from a given length, said switch having two closed and one open position whereby the electrode may be fed forward or back or retained stationary during the operation of the lamp.

4. In a searchlight arc-lamp, a negative electrode head provided with elements for clamping and propelling the electrode through the head, said head being hinged, a latch for locking the head against rotation about said hinge, means under the control of the latch for releasing the electrode from the clamping elements when the head is latched whereby the electrode may be moved when the head is rotated about said hinge.

5. In a searchlight arc-lamp a negative electrode head provided with gearing for feeding the electrode to compensate for consumption, a hand controlled mechanism for periodically actuating said feed gearing comprising a normally idle running eccentric friction element, another but centrally mounted friction element normally out of engagement with the eccentric element but adjustably mounted with respect thereto, means for causing a periodic and variable engagement with the latter, a worm wheel and a worm mounted to move in unison with the said second mounted element and to engage said worm wheel when the friction elements are brought into engagement, said worm wheel being connected with the feed gearing, said hand mechanism comprising a cam for adjusting the engagement between the friction elements and of the worm and the worm gear.

6. In an arc lamp, an electrode for the arc, a pair of feed mechanisms for feeding said electrode, a drive, connecting means between the drive and each of said feeding mechanisms and a control device for bringing the connecting means of the drive and of said feed mechanisms into operative relation alternatively, whereby the electrode may be operated by either feed, the connecting means for the drive and of one of said feed mechanisms comprising an oscillating member whereby the engagement between the drive and the last feed is rendered intermittent.

7. In an arc lamp, an electrode for the arc, a feed mechanism for the electrode, a driving mechanism for operating the feed, said drive comprising two rotatable elements in proximity of each other, one being eccentric with respect to the other, one of said elements being movably mounted whereby the elements may be brought into driving engagement.

8. In an arc lamp, an electrode for the arc, a feed mechanism for the electrode, a driving mechanism for operating the feed, said drive comprising two rotatable elements in proximity of each other, one being eccentric with respect to the other, one of said elements being movably mounted whereby the elements may be brought into driving engagement, said movably mounted element being adjustable whereby the distance between the two elements may be varied to cause intermittent engagement between the elements and to vary the time of engagement, one of such elements being adapted to drive the other when both elements are in engagement.

9. In an arc-lamp an electrode for the arc, a pair of feed mechanisms for feeding the electrode, a drive connecting means between the drive and each of said feed mechanisms, and a control device for bringing the connecting means and the drive into operative relation alternatively whereby the electrode may be operated by either feed mechanism, an electromagnetic device, the connection between the drive and one of the feed mechanisms being under the control of the electromagnetic device.

10. In an arc lamp, an electrode for the arc, a feed mechanism for feeding the electrode, a drive, connecting means for connecting the drive with said feed, the connecting means between said drive and said feed comprising a shaft rotated about two different axes, whereby movement about one axis varies the rate of feed and rotation about the other axis disconnects the feed from the drive.

11. A searchlight arc-lamp, comprising a fixed positive and a negative electrode holder mounted on an elastically supported arm in position of contact between the electrodes when no current passes, and electro-magnetic means for moving the arm against its elastic support to separate the electrodes and thereby strike the arc when current passes.

12. A searchlight arc-lamp, comprising a fixed positive electrode holder and a negative electrode holder mounted on a pivoted spring supported arm in position of contact between the electrodes when no current passes, and electro-magnetic means for turning the arm about its pivot against the action of the spring when current passes and thereby striking the arc.

13. A searchlight arc-lamp, comprising a fixed positive electrode holder and a negative electrode holder mounted on a spring supported arm in position of contact between the electrodes when no current passes, and an electromagnet in series with the arc acting upon the arm to turn the same about its pivot against the spring when current passes and thereby striking the arc.

14. A searchlight arc-lamp, comprising a fixed positive electrode holder, an elastically supported pivoted arm, a negative electrode holder hinged to the arm so as to be movable transversely to the plane of movement of the arm, electromagnetic means for moving the arm about its pivot for striking the arc, and manually actuated means for turning the negative head about its hinge.

15. In a searchlight arc-lamp, a positive electrode head comprising a central open framework housing but exposing for free heat radiation mechanism for rotating and feeding the electrode, a heavy metal structure constituting the forward part of the head, provided with heat radiating ribs and carrying the contact block or brush for the electrode, and a rear portion of the head supporting hand actuated mechanism for starting and suspending the rotation and feeding of the electrode and the access of current to the electrode.

16. In a searchlight arc-lamp, a positive electrode head comprising planetary gearing for holding and rotating the electrode about its axis, said gearing containing a serrated wheel mounted eccentrically to the electrode, in combination with a serrated segmental rack movable in the plane of the orbit of the wheel for periodic engagement with the same, whereby the electrode is fed to compensate for consumption, and an electromagnet for moving rack when electrode feed is required.

17. In a searchlight arc-lamp, a positive electrode head comprising planetary gearing for holding and rotating the electrode about its axis, said gearing containing a serrated wheel mounted eccentrically to the electrode, in combination with a segmental serrated rack adjustable in the plane of the orbit of the wheel for periodic and variable engagement with the same, whereby the electrode is periodically fed to compensate for consumption, and hand controlled means for adjusting the position of the rack.

18. In a searchlight arc-lamp, an electrode holder having gearing for propelling the electrode forwardly to compensate for consumption, a serrated wheel by the axial rotation of which the gearing is actuated, another serrated element capable of engagement with the wheel so as to turn the same about its axis, and hand controlled means for engaging the serrated elements periodically during periods of a desired duration.

19. An electro-magnetically controlled circuit reverser, comprising an electromagnet, a spring, an armature carrying a movable contact responsive to the action of said spring, and means whereby the effective force of said spring is abruptly changed at some point in the movement of said armature.

20. A circuit reverser comprising an electromagnet, an armature carrying a movable contact, two fixed contacts in the path of the movable contact, an arm pivoted to the armature, a spring exerting a pull upon the arm in a direction above its pivot and adjustable means whereby said arm is subjected to the action of the transverse components of the pull of the spring.

21. A circuit reverser operating to move and hold a switch arm on open circuit and in either of two circuit closing positions in stable equilibrium, comprising an electromagnet with specially provided leakage flux, an armature affording a path for the leakage flux and carrying a movable electric contact, two fixed but adjustable contacts in the path of the movable contact, an arm pivoted to the armature, a spring exerting a pull upon the arm in a direction above its pivot, and two adjustable spaced pivot stops for the arm, whereby the latter is subjected to the action of the transverse components of the pull of the spring and thereby reacts upon the armature.

22. In an arc lamp, an electrode for the arc, a feed mechanism for the electrode, a driving mechanism for operating the feed, said drive comprising two rotatable elements in proximity of each other, one being eccentric with respect to the other, one of said elements being movably mounted whereby the elements may be brought into driving engagement, a second drive mechanism mounted to be moved into and out of engagement with said feed, and electromagnetic means for controlling the movement of said second drive into and out of engagement with said feed.

23. In an arc lamp, an electrode for the arc, a feed mechanism for the electrode, a driving mechanism for operating the feed, said drive comprising two rotatable elements in proximity of each other, one being eccentric with respect to the other, one of said elements being movably mounted whereby the elements may be brought into driving engagement, a second drive mechanism mounted to be moved into and out of engagement with said feed, and electromagnetic means for controlling the movement of said second drive into and out of engagement with said feed, and interlocking means between said drives whereby when one is thrown into operative engagement with the feed the other is rendered inoperative to drive said feed.

In witness whereof, we have hereunto set our hands this 13th day of May, 1920.

EDWIN J. MURPHY.
LEONARD P. HUTT.

Certificate of Correction.

It is hereby certified that in Letters Patent No. 1,594,067, granted July 27, 1926, upon the application of Edwin J. Murphy and Leonard P. Hutt, of Schenectady, New York, for an improvement in "Searchlights," errors appear in the printed specification requiring correction as follows: Page 3, line 90, for the word "carriers" read *carries;* page 4, line 70, for the word "may" read *be;* page 6, line 51, for "17′" 117′; and that the said Letters Patent should be read with these corrections therein that the same may conform to the record of the case in the Patent Office.

Signed and sealed this 31st day of August, A. D. 1926.

[SEAL.]

M. J. MOORE,
*Acting Commissioner of Patents.*